US011587365B2

(12) United States Patent
Zucconelli et al.

(10) Patent No.: US 11,587,365 B2
(45) Date of Patent: Feb. 21, 2023

(54) DATA TRANSMISSION METHOD BETWEEN AN ON-BOARD DEVICE ADAPTED TO ACQUIRE DATA RELATING TO MOTION AND/OR DRIVING PARAMETERS OF A VEHICLE AND A REMOTE PROCESSING CENTER

(71) Applicant: OCTO TELEMATICS SPA, Rome (IT)

(72) Inventors: Paolo Zucconelli, Rome (IT); Giuseppe Zuco, Rome (IT)

(73) Assignee: OCTO TELEMATICS S.P.A., Rome (IT)

( * ) Notice: Subject to any disclaimer, the term of this patent is extended or adjusted under 35 U.S.C. 154(b) by 0 days.

(21) Appl. No.: 16/311,973

(22) PCT Filed: Jun. 27, 2017

(86) PCT No.: PCT/IB2017/053819
§ 371 (c)(1),
(2) Date: Dec. 20, 2018

(87) PCT Pub. No.: WO2018/002814
PCT Pub. Date: Jan. 4, 2018

(65) Prior Publication Data
US 2019/0206150 A1    Jul. 4, 2019

(30) Foreign Application Priority Data
Jun. 30, 2016   (IT) .................. 102016000067851

(51) Int. Cl.
*G07C 5/00* (2006.01)
*H04W 4/029* (2018.01)
(Continued)

(52) U.S. Cl.
CPC ............. *G07C 5/008* (2013.01); *G07C 5/085* (2013.01); *H04L 67/12* (2013.01); *H04W 4/029* (2018.02); *H04W 4/40* (2018.02); *H04W 4/44* (2018.02)

(58) Field of Classification Search
CPC ...... G07C 5/008; G07C 5/0808; G07C 5/085; G08G 1/20; H04L 67/12; H04W 4/027;
(Continued)

(56) References Cited

U.S. PATENT DOCUMENTS 6,771,665 B1 *   8/2004   Reed ................... H04L 63/0807
                                                  370/475
7,043,561 B2 *   5/2006   Hosomi ................. H04L 29/06
                                                  709/208

(Continued)

FOREIGN PATENT DOCUMENTS

WO       2014/172325 A1    10/2014

OTHER PUBLICATIONS

Rigney et al. "RFC 2865: Remote Authentication Dial In User Service (RADIUS)." IETF Network Working Group. Jun. 2000. (Year: 2000).*

(Continued)

*Primary Examiner* — James J Lee
*Assistant Examiner* — Steven Vu Nguyen
(74) *Attorney, Agent, or Firm* — Squire Patton Boggs (US) LLP

(57) ABSTRACT

Data transmission method between an on-board device adapted to acquire data relating to motion and/or driving parameters of a vehicle and a remote processing center, comprising the steps of: acquiring said data through the on-board device and storing it in a log memory of the on-board device; assessing by means of the on-board device if a logical condition is satisfied; sending, if said logical condition is satisfied, by means of the on-board device, a data connection request message requesting connection to a mobile cellular radio network to request the establishment of a GPRS connection between the on-board device and the remote processing center; receiving the data connection
(Continued)

request at the remote processing center, by means of the mobile cellular radio network; processing the data connection request message at the remote processing center to accept or reject the connection request based on said identifying data.

7 Claims, 1 Drawing Sheet

(51) Int. Cl.
  *H04W 4/44* (2018.01)
  *H04L 67/12* (2022.01)
  *H04W 4/40* (2018.01)
  *G07C 5/08* (2006.01)

(58) Field of Classification Search
  CPC ......... H04W 4/029; H04W 4/40; H04W 4/44; H04W 84/005
  See application file for complete search history.

(56) References Cited

U.S. PATENT DOCUMENTS

| | | | |
|---|---|---|---|
| 9,306,924 B2* | 4/2016 | Lehmann | .............. H04W 12/06 |
| 2005/0160373 A1* | 7/2005 | Chakravarty | ......... G06F 3/0482 715/827 |
| 2006/0194566 A1* | 8/2006 | Oesterling | ............. H04M 11/04 455/404.1 |
| 2007/0263560 A1* | 11/2007 | Saarisalo | ................ H04W 4/10 370/328 |
| 2009/0170537 A1* | 7/2009 | Mauti, Jr. | ............... H04L 67/04 455/466 |
| 2010/0035602 A1* | 2/2010 | Doherty | ................ H04W 48/16 455/425 |
| 2010/0093273 A1* | 4/2010 | Hohl | ................... H04L 67/1095 455/7 |
| 2011/0039559 A1 | 2/2011 | Yi et al. | |
| 2012/0030326 A1* | 2/2012 | Cassidy | ........... H04N 21/64738 709/223 |
| 2013/0021904 A1* | 1/2013 | Dolan | ............... H04W 12/0602 370/230 |
| 2014/0031005 A1* | 1/2014 | Sumcad | ............... H04W 4/023 455/405 |
| 2014/0157344 A1* | 6/2014 | Tine | ..................... H04N 21/239 725/115 |
| 2014/0358394 A1 | 12/2014 | Picciotti | |
| 2015/0258961 A1* | 9/2015 | Doherty | ............. B60R 25/1012 701/2 |

OTHER PUBLICATIONS

International Search Report for PCT/IB2017/053819 dated Oct. 10, 2017.

* cited by examiner

DATA TRANSMISSION METHOD BETWEEN AN ON-BOARD DEVICE ADAPTED TO ACQUIRE DATA RELATING TO MOTION AND/OR DRIVING PARAMETERS OF A VEHICLE AND A REMOTE PROCESSING CENTER

CROSS-REFERENCE TO RELATED APPLICATIONS

This application is the U.S. National Stage Application of International Patent Application No. PCT/IB2017/053819, filed on Jun. 27, 2017, which claims priority to Italian Patent Application No. 102016000067851, filed on Jun. 30, 2016, the contents of each of which is incorporated herein by reference in its entirety.

TECHNICAL FIELD OF THE INVENTION

The present invention relates to the technical field of telecommunications and in particular relates to a data transmission method between an on-board device adapted to acquire data relating to motion and/or driving parameters of a vehicle and a remote processing centre.

STATE OF THE ART

On-board devices for real-time acquisition and remote transmission for example to a remote processing centre, of data relating to motion and/or driving parameters of vehicles are known of and widely used. Such on-board devices advantageously allow the detection of accidents, the reconstruction dynamics thereof, the monitoring of driving styles and habits and the tracking of vehicles.

The aforesaid on-board devices are usually called telematics boxes or black boxes and are used to define the customised rates for insurance policies and/or real-time assistance in case of accidents and/or to reconstruct a posteriori the dynamics of claims for the purposes of attribution of liability to those involved. For example, an on-board device of the type indicated above is described in the international patent application filed by the same Applicant WO2013/150558 A1.

The on-board devices described above of the prior art are able to locate in real time the vehicle they are installed on, to register the acceleration and deceleration, the trajectories, the charge status of the battery of the vehicle, and are also able to communicate with a remote processing centre. This communication takes place via standard or proprietary communication protocols. This communication is usually bidirectional and allows the implementation and provision of additional services both for the insurance company and the end customer. Among these services for example is the alarm for car theft. Such alarm may be generated either automatically by the on-board device upon occurrence of certain conditions, or by the remote processing centre at the request of the end-user. For the provision of such services it is therefore essential to ensure a stable and effective communication between the on-board device and the remote processing centre. The communication protocols characterize both the format of the messages sent between the on-board devices and the remote processing centre and the data saving format acquired by the sensors of the on-board device. Such data may be communicated immediately to the remote processing centre or stored in the on-board device if, due to lack of signal or for other opportune reasons it is not possible or desirable to send them to said centre. The data transmission methods between the on-board devices of the prior art and the remote processing centre have some drawbacks however.

A first drawback consists in the fact that the protocols used are either meant to be used by exploiting a particular communication channel, or are optimized for bidirectional communication with the remote processing centre and not for storing the acquired data or vice versa. This lack of flexibility leads to a lack of optimization both in relation to the use of different communication channels, such as SMS, USSD, GPRS and PSTN and in relation to the storage on the on-board device of the data acquired. In fact in situations where the network signal is poor the on-board devices should be able to change the communication channel so as to ensure the timely signalling to the events centre for example of requests for assistance, attempted theft or accidents.

A second drawback is that the data transmission protocols implemented by the on-board devices of the prior art prove not to be optimized with regard to band usage for the transmissions. It follows that such on-board devices require more time to send both the data acquired by the sensors and the alarm messages for signalling of the aforementioned events. This drawback makes it impossible to ensure the proper management of communications and as a result of the services associated with them. Security requisites also fall into this context. It is in fact necessary in some cases to send encrypted information to comply with current legislation in terms of privacy. The encryption of the messages has the effect of increasing the band needed for dispatch and thus makes the use of non-optimized communication protocols even more critical.

The object of the present description is to provide a data transmission method which solves or at least partly reduces the drawbacks described above with reference to the data transmission methods of the prior art Such object is achieved by a data transmission method as generally defined in claim 1. Preferred and advantageous embodiments of the aforesaid data transmission method are defined in the appended dependent claims.

The invention will be clearer to understand from the following detailed description of a particular embodiment, made by way of a non-limiting example with reference to the appended drawings, briefly described in the following paragraph.

DETAILED DESCRIPTION

Figure 1:
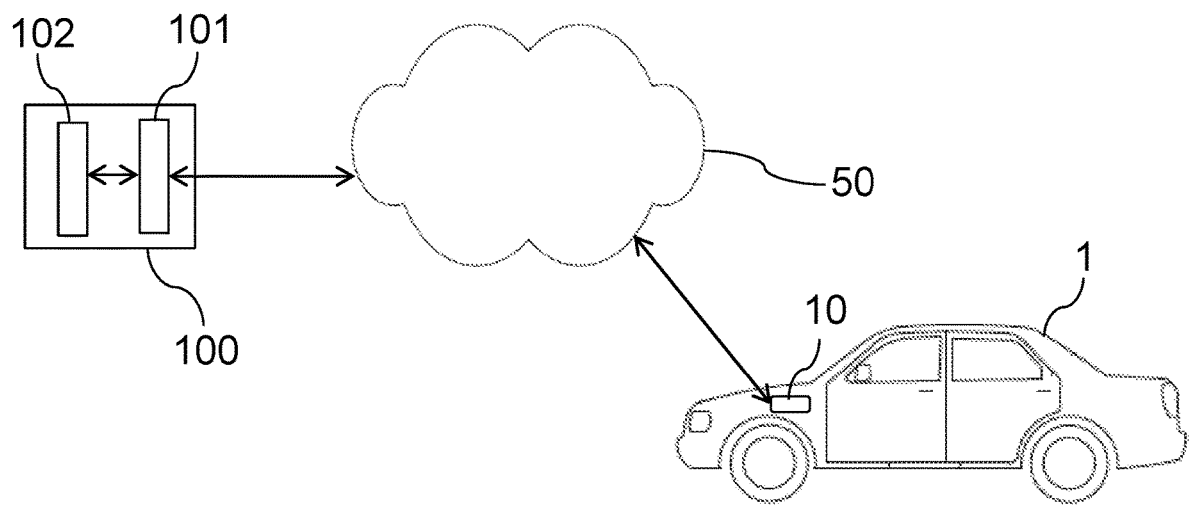
FIG. 1 shows a functional block diagram by way of example of a system adapted to implement a data transmission method between an on-board device adapted to acquire data relating to motion and/or driving parameters of a vehicle and a remote processing centre.

FIG. 1 shows an embodiment by way of a non-limiting example of a data transmission system between an on-board device adapted to acquire data relating to motion and/or driving parameters of a vehicle and a remote processing centre. In the example, the system comprises an on-board device 10 installed in a vehicle 1. The vehicle 1 is for example a car, but could actually even be a motorcycle or public means of transport such as a bus generally any transport or work vehicle, for example even an agricultural vehicle. The system comprises a mobile cellular radio network 50, for example a GSM network. Such network 50 comprises software and hardware equipment such as for example one or more mobile switching centres (MSC). The data transmission system further comprises at least one remote processing centre 100. The mobile cellular network 50 enables data transmission between the on-board device 10 and the remote processing centre 100. This data transmission is preferably a bidirectional transmission. The remote processing centre 100 is configured to receive and process data acquired from a plurality of on-board devices 10 installed on board respective vehicles 1. The remote processing centre 100 is a hardware and software system that allows the monitoring of vehicles for example to evaluate risk factors in the driving thereof, the driving habits of the drivers of the vehicles, to receive rescue requests, detect accidents, theft etc. The number of vehicles managed by the remote processing centre 100 may be as big as desired, for example, to the order of hundreds of thousands or millions.

According to one embodiment the remote processing centre 100 comprises a front end server 101 and a back-end server 102 operatively connected to each other. The front end server 101 is adapted and configured to receive connection requests from the on-board devices 10, and preferably to perform some pre-processing of the data received therefrom.

The back-end server 102 comprises an advanced computing platform and a database for storing and processing the data pre-processed by the front end server 101. The front end server 101 is adapted and configured to acts as a connection interface of the back-end server 102 to the mobile cellular network 50.

Figure 2:
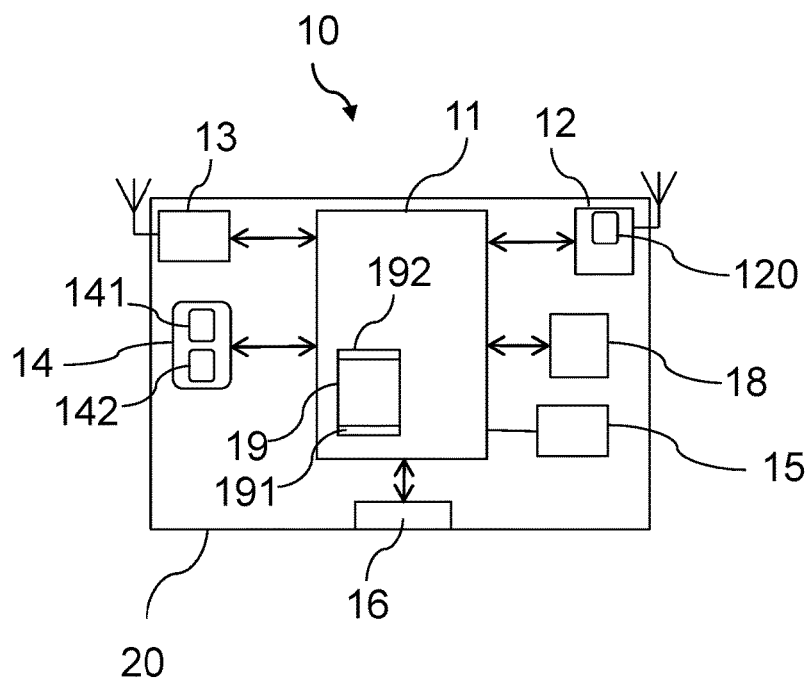
FIG. 2 shows a functional block diagram of an embodiment by way of a non-limiting example of an on-board device of the system in FIG. 1.

FIG. 2 shows a preferred, non-limiting embodiment of an on-board device 10. The on-board device 10 comprises a watertight container 20 inside which the electronic components of the on-board device 10 are housed. Preferably the on-board device 10 is powered by the battery of the vehicle 1 and more preferably the container 20 is attached to the aforesaid battery.

The on-board device 10 comprises a processing unit 11, such as for example a microcontroller or microprocessor, and a GSM-GPRS communication interface 12 operatively connected to the processing unit 11. Such communication interface 12 comprises a SIM 120, preferably a so-called SIM on chip. The on-board device 10 further comprises at least one sensor 14. For example the on-board device comprises a triaxial accelerometer 141 and a gyroscope 142 operatively connected to the processing unit 11. According to a preferred embodiment the triaxial accelerometer 141 and the gyroscope 142 are digital MEMS and 3D devices integrated in a single electronic device 14.

The on-board device 10 further comprises at least one GNSS Receiver 13, such as an active GNSS antenna, operatively connected to the processing unit.

According to one embodiment, the on-board device 10 further comprises a short range communication interface 18, for example a Bluetooth communication interface operatively connected to the processing unit 11. Preferably and in a non-limiting manner the aforesaid Bluetooth interface is a BTLE interface—Bluetooth Low Energy.

Preferably, the on-board device 10 further comprises a voltage regulator circuit 15 adapted to power the on-board device 10 starting from the signal provided by the battery of the vehicle 1.

According to one embodiment the on-board device 10 comprises a communication port 16, operatively connected to the processing unit 11. To this communication port 16 a further device not shown in the drawings may be connected, the purpose of which is to increase the capacity and/or functions of the on-board device 10 such as the storage resources or processing resources or communication interfaces or the number and/or type of sensors.

The on-board device 10 further comprises a log memory 18 for example integrated in the processing unit 11. For instance such memory is a Flash memory. The on-board device through the processing unit 11 is such as to periodically store and/or based on events in the Log memory 18 data relating to motion and/or driving parameters of the vehicle 1. Such data comprises, for example and without thereby introducing any limitations: speed, accelerations, decelerations, shock, location, diagnostic data of the vehicle 1, alarms generated by the on-board device 10, temperature, etc. Typically this data comprises data regularly acquired during normal use of the vehicle 1, for example on a periodic basis, and herein referred to as "first data" and stored data in case of special events, for example events that the processing unit 11 may interpret as potentially representative of events such as a theft or an accident, herein referred to as "second data".

The data transmission method described below makes it possible to optimize band and storage resources, so as to appropriately manage the transmission of the first and second data from the on-board device 10 to the remote processing centre 100.

As already explained above the data transmission method comprises a step of acquiring said data via the on-board device 10 and storing them in the log memory 18 of the on-board device 10.

The data transmission method further comprises a step of assessing by means of the on-board device 10 if a logical condition is satisfied comprised in a plurality of possible logical conditions each associated with a respective type of event. For example, if the on-board device 10 detects that the vehicle 1 has been subjected to a sudden shock, the logical condition could be that represented by the exceeding of a threshold value of the acceleration modulus detected by the acceleration sensor. The type of event in this case is therefore a possible accident. It is thus possible to define, using the data acquired by the processing unit 11 different types of conditions and different types of event. For this reason, there are event types that represent normal conditions of use, event types that represent abnormal conditions, event types that represent the conditions of risk or danger, etc.

The data transmission method further comprises a step of sending, if said logical condition is satisfied, by means of the on-board device 10, a data connection request message to a mobile cellular radio network to request the establishment of a GPRS connection between the on-board device and the remote processing centre, wherein the data connection request message includes at least one data identifying the type of event associated with the aforesaid logical condition. For example, an event type for which the on-board device seeks to establish a GPRS connection with the centre is to empty the log memory 18.

According to one embodiment of the above-mentioned connection request data message is a RADIUS packet—Remote Authentication Dial-In User Service—and preferably a RADIUS Access Request packet.

The transmission method further comprises a step of receiving at the remote processing centre 100 via the mobile cellular radio network 50, the connection request data message sent from the on-board device 10.

The data transmission method further comprises a step of processing the connection request data message at the remote processing centre 100 for accepting or rejecting the connection request based on said identifying data.

This way, advantageously, if the remote centre 100 receives a high number of simultaneous connection requests from respective on-board devices 10 thanks to the ability to selectively accept them it ensures the proper management of the requests according to a defined scale of priorities.

According to an advantageous embodiment the connection request data message comprises data identifying the on-board device 10 and, in the processing step the connection request is accepted or rejected also based on said data identifying the on-board device. If the request is accepted the on-board device 10 receives for example a RADIUS packet containing an IP address assigned to the on-board device 10.

According to one embodiment, the transmission method further comprises a step of identifying a subset of conditions in the plurality of conditions, wherein the assessment step comprises a step of determining whether said logic condition belongs to said subset of conditions. If this occurs, the transmission method further comprises a step of sending a USSD short message and/or SMS from the on-board device 10 to the remote processing centre 100 in addition to the GPRS connection request data message.

Preferably, the assessment step comprises a step of assessing whether a given portion 191 of the log memory 19 has been filled. Preferably, said portion 191 has a smaller size compared to the overall capacity of the log memory 19.

According to a preferred embodiment, the possible types of event comprise:
Filling of a given portion of the log memory;
Potential theft of the vehicle;
Potential accident of the vehicle;
Diagnostic alarm detected by the on-board device;
Request for assistance.

According to an advantageous embodiment the log memory 19 comprises an area of FAT memory, and the method comprises, once the GPRS connection is established:
a step of sending from the on-board device to the remote processing centre data packets stored in the log memory;
a step of receiving at the on-board device a confirmation of receipt of the data packets by the remote processing centre;
a step of erasing/rewriting from the log memory the data packets received from the remote processing centre, indexing in the FAT memory portions of memory that contain erased or rewritable data packets and portions of memory that contain data packets not yet sent to the remote processing centre or data packets sent from the on-board device 10 but for which the on-board device 10 has not received a confirmation of receipt from the remote processing centre 100.

A particular preferred and non-limiting protocol example will be described below by means of which said transmission method can be implemented. This protocol is preferably a transport level protocol packet based on a unique data structure defined by a series of fixed and variable length fields containing variables stored in Little Endian format. Preferably the aforesaid protocol is a connectionless type protocol and is able to manage the reordering of the packets and the retransmission of those lost, unlike, for example, the UDP protocol.

Preferably, the protocol provides basic transport level services, such as error checking and therefore the integrity of data transmitted by means of a checksum. The communication protocol is also preferably a stateless protocol, which does not take note of the connection status, having for this reason less information to store: this way the remote processing centre will be able to support many more active devices.

The exchange of data between the remote processing centre 100 and the on-board device 10 may be via GPRS or SMS/USSD/PSTN. Depending on the transmission channel, the message structure can change in order to meet the useful load constraints.

A particularly preferred embodiment of the aforementioned message will be described below. The first field 2 bytes long contains the message header, i.e. two hexadecimal values that uniquely identify the beginning of the message. The second field 2-bytes long instead contains the information of the total length in bytes of the message. The third field 8-bytes long contains a unique identifier relative to the on-board device 10, which is also used as a public key in the case of some encryption algorithms used. The fourth field 3 bytes long contains instead the software version present on the on-board device, to allow the proper management of the communication protocol even in the case of evolutionary software. The fifth field 4-bytes long contains the time instant in which the message was generated, to allow a correct reconstruction of the order of creation of messages even in cases where the transmission reverses the order of departure and arrival thereof. The sixth field 1 byte long contains the message class. The seventh field 2 bytes long contain the type of the message. The eighth field 1 byte long contains information relating to the communication channel used, the ninth field variable in length contains the optional and specific data of each message class and type. The last field contains a signature calculated using a CRC algorithm useful to monitor message integrity during transmission. The communication protocols are characterized by a high number of message formats. Preferably, the protocol used in the present method classifies these formats into classes and types within classes. Thanks to this classification, the two-class fields and type of message make it possible to uniquely identify both the type of service which the communication regards, and its progress, as well of course as the format of the message data field. In fact, each message class can be associated with a service, and each service is characterized by a clearly-defined sequence of messages which are exchanged between the on-board devices 10 and the remote centre 100. Each of these messages is assigned a given type identifier (also of the event type), so as to easily follow the performance progress of each service starting from the class and type of message that is sent.

For example, the protocol requires that the on-board devices 10 should respond with an acknowledgement message confirming successful activation to all messages sent to the on-board devices 10 containing a service activation command. By way of example, let us take the class of messages relative to the tracking service, which consists of the possibility of sending from the remote processing centre a command to enable the on-board device 10 to send information on its location at specific time or space intervals. Different types of messages are associated with the tracking class and in particular: the tracking service setting command of the device; the message of correct reception of the tracking command; the location message; the end of service command, and finally the message of correct reception of the end of tracking command.

Preferably, the aforementioned protocol includes not only a specific format for the exchange of messages between the on-board devices 10 and the centre 100, but also a format for storing data acquired from the field. This format is characterized by a lighter data structure, and a fixed length. The choice to define a fixed length records allows improved and deterministic management of the memory inside the devices. These records are composed of a common structure formed by a 1 byte long field in which the message identifier is saved, a second field of 18 bytes the content of which varies depending on the identifier, and finally a 1-byte field containing the CRC of the message used to perform a consistency check on the data transmitted. The second field is the field containing the data acquired from the device and its structure is unique as the message identifier varies. The protocol defines for example approximately 180 different data structures for the records. This is to ensure maximum efficiency between the message size and quantity of information contained therein. Depending on the identifier the records may contain information relative to the position, the internal status of the device, the speed and acceleration of the device, the quality of the GPRS or GPS signal, . . . In the record data field, there is almost always a sub-field containing the packet creation time. This information may be omitted if a set of acquired data needs to be split into multiple records. It is important to note that where possible the data fields are characterized by bit masks which allow optimization of the load of data transmitted for the same information contained in the messages. The bit masks in fact enable the saving of 8 Boolean values relative for example to the internal status of the device, in the storage space of an ASCII character. We can therefore say that the definition of a protocol with these features allows absolute flexibility both for the storage of data on embedded devices with limited and fixed memory resources and for exchanging data of different types with the processing centre.

The basic structures of the packets that characterize an example of a communication protocol usable in the transmission method proposed herein have been described. It is moreover evident that numerous variations and modifications may be made to the internal data structures and to the various types of messages to suit different operating requirements, while remaining within the scope of protection of the present invention.

From the above description it is evident that a data transmission method of the type described above makes it possible to fully achieve the intended purposes in terms of overcoming the drawbacks of the prior art.

This method in fact overcomes the limitations of the methods of the prior art by guaranteeing an optimal communication between the on-board device 10 and the remote processing centre 100, specific to this field of application. The transmission method described herein proves optimized and flexible ensuring the minimum possible band usage by each communication channel used.

Without prejudice to the principle of the invention, the embodiments and construction details may be varied widely with respect to what has been described and illustrated purely by way of a non-limiting example, without thereby departing from the scope of the invention as defined in the appended claims.

The invention claimed is:

1. Data transmission method between an on-board device adapted to acquire data relating to motion and/or driving parameters of a vehicle and a remote processing center, the method comprising:
    acquiring said data relating to motion and/or driving parameters of the vehicle through the on-board device and storing them in a log memory of the on-board device;
    defining, using said data relating to motion and/or driving parameters of the vehicle, a plurality of conditions and a plurality of types of event;
    identifying, using said data relating to motion and/or driving parameters of the vehicle, a subset of conditions in a plurality of conditions each associated with a respective type of event;
    responsive to a determination that a logical condition within one of the plurality of conditions is satisfied, sending from the on-board device, a data connection request message to request the establishment of a GPRS connection between the on-board device and the remote processing center, wherein the data connection request message includes at least one data identifying the type of event associated with said logical condition and wherein said at least one data identifying the type of event is an event type identifier assigned by the on-board device to the data connection request message;
    responsive to a determination that said logical condition is within said identified subset of conditions, sending a message from the on-board device in addition to the data connection request message; and
    receiving acceptance or rejection of connection request according to said at least one data identifying the type of event, wherein responsive to acceptance of the connection request, receiving at the on-board device a RADIUS packet containing an IP address assigned to the on-board device.

2. Transmission method according to claim 1, wherein the data connection request message comprises data identifying the on-board device and wherein, in the receiving the connection request is accepted or rejected also based on said data identifying the on-board device.

3. Transmission method according to claim 1, wherein the determination that a logical condition within one of the plurality of conditions is satisfied comprises assessing whether a given portion of the log memory was filled.

4. Transmission method according to claim 3, wherein said given portion of the log memory has a smaller size than the overall capacity of the log memory.

5. Transmission method according to claim 1, wherein possible types of event include:
    filling of a given portion of the log memory;
    potential theft of the vehicle;
    potential accident of the vehicle;
    diagnostic alarm detected by the on-board device;
    request for assistance.

6. Transmission method according to claim 1, wherein the log memory comprises an area of FAT memory, and wherein the method comprises, once the GPRS connection is established:
    sending from the on-board device to the remote operations center data packets stored in the log memory;
    receiving at the on-board device a confirmation of receipt of the data packets by the remote processing center;
    erasing/rewriting from the log memory the data packets sent to the remote processing center and whose reception is confirmed by the remote processing center, indexing in the FAT memory portions of memory that contain the erased or rewritable data packets and portions of memory that contain the data packets not yet sent to the remote processing center or the data packets sent but for which the on-board device has not received a confirmation of receipt by the remote processing center.

7. Data transmission method between an on-board device adapted to acquire data relating to motion and/or driving parameters of a vehicle and a remote processing center, the method comprising:
  acquiring said data relating to motion and/or driving parameters of the vehicle through the on-board device and storing them in a log memory of the on-board device;
  defining, using said data relating to motion and/or driving parameters of the vehicle, a plurality of conditions and a plurality of types of event;
  identifying, using said data relating to motion and/or driving parameters of the vehicle, a subset of conditions in a plurality of conditions each associated with a respective type of event;
  responsive to a determination that a logical condition within one of the plurality of conditions is satisfied, sending from the on-board device, a data connection request message to request the establishment of a GPRS connection between the on-board device and the remote processing center, wherein the data connection request message is a Radius packet and includes at least one data identifying the type of event associated with said logical condition and wherein said at least one data identifying the type of event is an event type identifier assigned by the on-board device to the data connection request message;
  responsive to a determination that said logical condition is within said identified subset of conditions, sending, a message from the on-board device in addition to the data connection request message; and
  receiving acceptance or rejection of connection request according to said at least one data identifying the type of event, wherein responsive to acceptance of the connection request, receiving at the on-board device a RADIUS packet containing an IP address assigned to the on-board device.

\* \* \* \* \*